J. HARDAKER.
Self Acting Temple for Looms.
No. 231,809.    Patented Aug. 31, 1880.
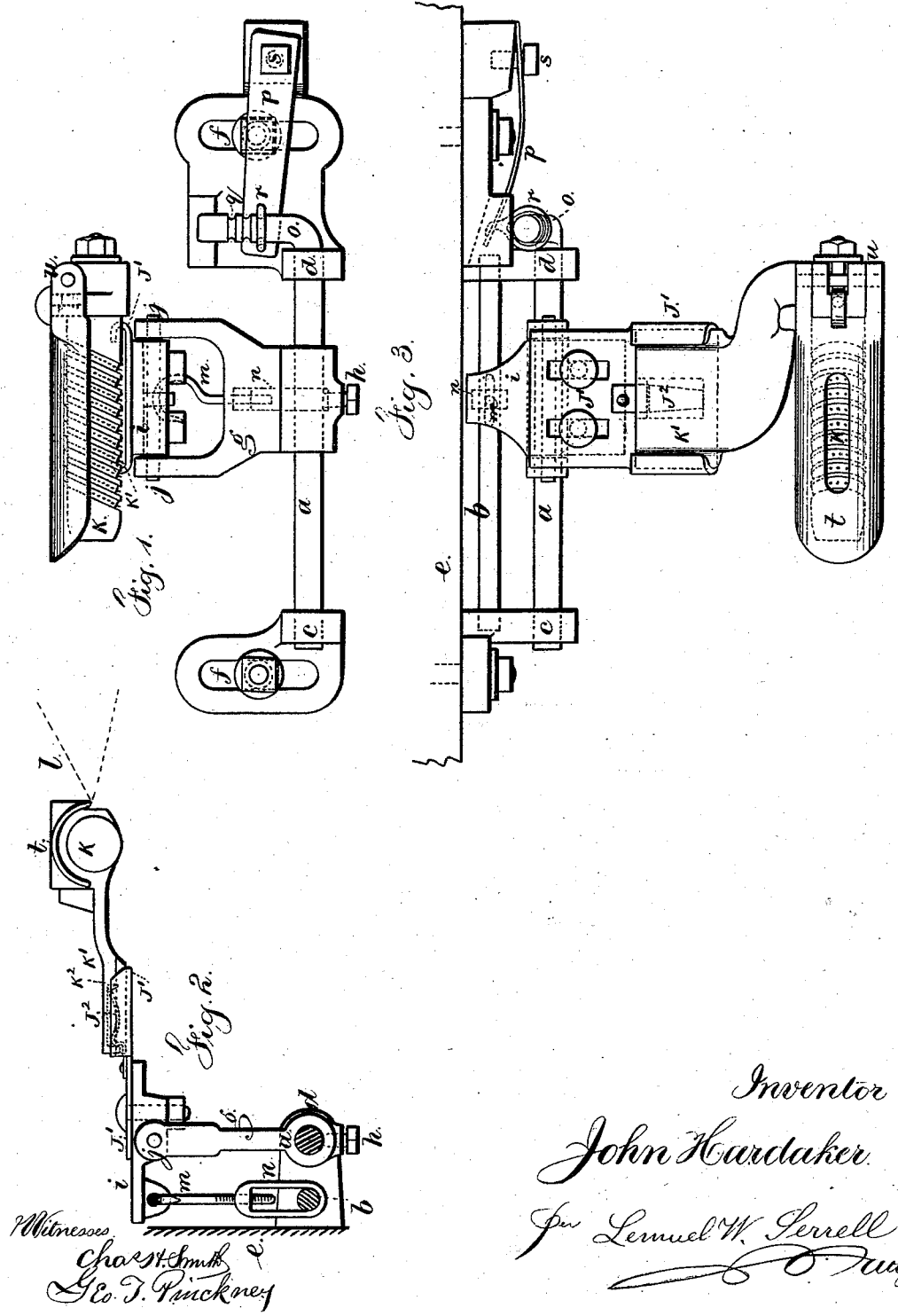

UNITED STATES PATENT OFFICE.

JOHN HARDAKER, OF LEEDS, ENGLAND.

SELF-ACTING TEMPLE FOR LOOMS.

SPECIFICATION forming part of Letters Patent No. 231,809, dated August 31, 1880.

Application filed May 14, 1879. Patented in England July 14, 1875.

*To all whom it may concern:*

Be it known that I, JOHN HARDAKER, of Leeds, in the county of York, England, have invented new and useful Improvements in Self-Acting Temples for Looms, which improvements are fully set forth in the following specification, reference being had to the accompanying drawings.

The object of my invention is to provide apparatus which shall give or allow the required movement to self-acting temples by which they adapt themselves to the peculiar movement of the material being woven, at the same time retaining their hold thereon close or near to the fell during the operation of weaving, stretching the material at the same time to the required width, and is as hereinafter described.

Figure 1 represents a front elevation; Fig. 2, a sectional elevation; and Fig. 3, a plan, looking at the top.

$a$ and $b$ are two rods, which, by preference, are made parallel to each other. These are mounted in suitable bearings $c$ and $d$, which are carried and fixed on the breast-rail $e$ of the loom. These brackets or bearings $c$ and $d$ are provided with slots $f$ for the purpose of adjustment. On the front rod, $a$, is provided an arm, $g$, which may be adjusted to any required position and fixed therein by means of the set-screw $h$. The object of making the arm $g$ adjustable is to suit the width of the material being woven. On the top of the arm $g$ is mounted a bracket, $i$, which is hinged at $j$. On the bracket $i$ is attached the self-acting temple (which may be of ordinary construction) by means of the carrier $J'$, which may be of sheet-iron or any suitable material.

The part $K'$ of the self-acting temple is fitted so as to slide into the carrier $J'$, and is retained in position by means of the spring $J^2$, which acts against the projection $K^2$, and is placed in position as shown. This spring admits of the temple being set free when any undue pressure comes against it, and renders it less liable to damage than when held tight, as heretofore.

I am fully aware that a spring, $J^2$, has been used for retaining the part $K'$ of the temple, but acting in the reverse direction, which had the effect of holding the temple tight in any position. This I find by practice is a very defective arrangement.

In order to keep the temple-roller K in proper position with regard to the material, which latter is represented by the line $l$, and to prevent it coming in contact with the other moving parts, I connect the bracket $i$ to the rod $b$ by means of the hook $m$ and eye or loop $n$. The distance between the rod $b$ and bracket $i$ (to which the self-acting temple is attached by means of the carrier $J'$) may be adjusted for the purpose of regulating the height of the temple-roller K by means of the adjusting-screw on the hook $m$, whereby the hook $m$ may be screwed to any required distance into the eye or loop $n$.

In order to permit of a self-acting adjustment of the temple, the rod $a$, carrying the arm $g$, is made loose in its bearings $c$ and $d$, and admits of a radial movement. One end of the rod $a$ is turned up or cranked, as shown at $o$. At this point the rod is acted upon by a spring, $p$, and for the purpose of regulating the action of the spring $p$, I provide any number of notches $q$, in any of which the loop $r$ (which is attached to the spring $p$) may be placed, reducing or increasing thereby the amount of leverage, and consequently the power of the spring $p$, which power is conveyed to the rod $a$, arm $g$, and hinged bracket $i$, and to the temple.

The power of the spring $p$ may be also increased by adjusting the set-screw $s$. This arrangement admits of the self-acting movement of the temple, with the horizontal and vertical movement of the material, at the same time retaining its hold on the material and stretching it to its required width.

Instead of having the cover $t$ of the temple hinged on the side of the bracket, as is ordinarily done, I hinge it at the end, as shown at $u$. By this means it is more readily got away clear of the temple, and the cover is more firmly held in position when hinged in this manner, being more capable of resisting any blow which might take place in the shuttle-trap.

I would here remark that self-acting temples of a somewhat similar kind have been used before; but they have been mounted on fixed brackets on the breast-rail, and therefore could not adjust themselves to the various and peculiar movements of the material being woven, and hence their inefficiency and irregularity, more especially in heavy or hard-made cloth; but by applying the hereinbefore-mentioned apparatus, such movements, whether much or little, or however varied, are provided for, which enables the griping part of the temple to retain its hold of the cloth close or near to the fell, and, as the case may be, even within the limits of the "sley" traverse. I thus provide such a movement that the self-acting temple is capable of adapting itself to the above-named peculiar movement of the material, and a regular width of material is also obtained throughout the whole piece.

Having now described the nature of the said invention, what I claim is—

1. The combination, with the temple, of the bracket $i$, carrier J', hinged arm $g$, turning rod $a$, provided with crank $o$, bearing-brackets $c$ $d$, and spring $p$, provided with loop $r$, substantially as set forth.

2. The screw-hook $m$, loop $n$, brackets $c$ $d$, and rod $b$, in combination with the bracket $i$, carrier J', and temple, substantially as set forth.

JOHN HARDAKER.

Witnesses:
J. W. HARDING,
WM. FAIRBURN-HART.